United States Patent
Chuang et al.

(10) Patent No.: US 8,922,964 B2
(45) Date of Patent: Dec. 30, 2014

(54) MOTOR CONTROLLER WITH REVERSE-BIAS PREVENTING MECHANISM

(71) Applicant: Industrial Technology Research Institute, Hsinchu (TW)

(72) Inventors: Kun-Lun Chuang, Hsinchu County (TW); Shin-Hung Chang, Taoyuan County (TW); Tshaw-Chuang Chen, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 188 days.

(21) Appl. No.: 13/711,145

(22) Filed: Dec. 11, 2012

(65) Prior Publication Data

US 2014/0092501 A1 Apr. 3, 2014

(30) Foreign Application Priority Data

Sep. 28, 2012 (TW) .............................. 101135930 A

(51) Int. Cl.
  *H02H 3/00* (2006.01)
  *H02H 9/00* (2006.01)
  *H02H 11/00* (2006.01)
  *H02P 1/00* (2006.01)
  *H02H 7/08* (2006.01)

(52) U.S. Cl.
  CPC .............. *H02H 9/00* (2013.01); *H02H 11/002* (2013.01); *H02P 1/00* (2013.01); *H02H 7/08* (2013.01)
  USPC ........... 361/88; 361/245; 361/91.1; 361/91.6; 361/90

(58) Field of Classification Search
  USPC ........ 361/18, 21, 56, 57, 82, 84, 88, 90, 91.1, 361/91.6, 245; 318/139, 400.21, 400.22, 318/400.01, 722, 801, 701, 727, 799, 289
  See application file for complete search history.

(56) References Cited

U.S. PATENT DOCUMENTS 6,060,859 A 5/2000 Jonokuchi
(Continued)

FOREIGN PATENT DOCUMENTS

CN 1595786 A 3/2005
(Continued)

OTHER PUBLICATIONS

Reverse Current/Battery Protection Circuits, Application Report, SLVA139-Jun. 2003, Texas Instruments Incorporated.
(Continued)

*Primary Examiner* — Antony M Paul
(74) *Attorney, Agent, or Firm* — Morris Manning & Martin LLP; Tim Tingkang Xia, Esq.

(57) ABSTRACT

A motor controller with a reverse-bias preventing mechanism includes a pre-charging unit, a protection unit, a conversion unit and a control unit. The pre-charging unit receives a power signal through a first electric-conduction path, and converts the power signal into a pre-charging signal according to a control signal. The protection unit receives the power signal through a second electric-conduction path, and determines whether to output the power signal, according to the polarity of the power signal. The conversion unit, coupled to the protection unit, receives the power signal outputted by the protection unit, and converts the power signal into a work voltage. The control unit, coupled to the conversion unit and the pre-charging unit, receives the work voltage to generate the control signal. The current of the power signal flowing through second electric-conduction path is smaller than the current flowing through first electric-conduction path.

6 Claims, 2 Drawing Sheets

(56) References Cited

U.S. PATENT DOCUMENTS

| | | | |
|---|---|---|---|
| 6,304,422 | B1 | 10/2001 | Sander et al. |
| 7,012,793 | B2 * | 3/2006 | Cheevanantachai et al. ... 361/82 |
| 8,067,859 | B2 * | 11/2011 | Koeppl et al. ................ 307/127 |
| 2007/0183031 | A1 | 8/2007 | Xu et al. |
| 2011/0148190 | A1 * | 6/2011 | Gronwald .................... 307/9.1 |

FOREIGN PATENT DOCUMENTS

| | | |
|---|---|---|
| TW | 200410468 | 6/2004 |
| TW | M245664 | 10/2004 |
| TW | 200935674 | 8/2009 |
| TW | 201014102 A | 4/2010 |

OTHER PUBLICATIONS

Reverse Battery Protection with Hexfets Doubles Battery Life, DT-94-8, International Rectifier, Applications Eng.

Protect Sensitive Circuits from Overvoltage and Reverse Supply Connections, 2011, Linear Technology Corporation Design Notes 497.

Purschel, Marco, Reverse Battery Protection, 2005, Application Note, V1.0, Infineon Technologies.

Ideal Diode, Reverse-Battery and Overvoltage Protection Switch/ Limiter Controllers with External MOSFETs, 2009, Maxim Integrated Products, Inc., 19-4964, Rev o' 9/09.

Intellectual Property Office, Ministry of Economic Affairs, R.O.C., "Office Action", Jul. 11, 2014, Taiwan.

* cited by examiner

US 8,922,964 B2

MOTOR CONTROLLER WITH REVERSE-BIAS PREVENTING MECHANISM

CROSS-REFERENCE TO RELATED APPLICATIONS

This non-provisional application claims priority under 35 U.S.C. §119(a) on Patent Application No(s). 101135930 filed in Taiwan, R.O.C. on Sep. 28, 2012, the entire contents of which are hereby incorporated by reference.

BACKGROUND

1. Technical Field

The disclosure relates to a reverse-bias preventing protection device, and more particularly to a motor controller with a reverse-bias preventing mechanism and a motor driving device.

2. Related Art

In the applications of motor driving, a motor controller is frequently connected to electric power in reverse polarity connection due to carelessness of assembly workers, and the reversed electric power may cause damage of the next level circuit components. For preventing the damages of the next level circuit components caused by the reverse connection of the electric power, a reverse-bias preventing unit is disposed between an input end of the electric power and the motor controller. The reverse-bias preventing unit is electric-conductive when the polarity of the electric power is connected in a positive bias, and is cut off when the electric power is connected in reverse bias, for preventing reversed electric power from damaging the motor controller and the next level circuit components.

Generally, the reverse-bias preventing unit is disposed on a main loop of a circuit structure. That is, the reverse-bias preventing unit is disposed on the main loop between the input end of the electric power and the motor controller, for preventing the next level circuit components and loads from being burned-out and damaged. In addition, the reverse-bias preventing unit is mainly implemented by a Schottky diode or a field effect transistor (such as a MOSFET).

Because the current of the electric power flowing through the main loop is relatively larger, thus the volumes of the Schottky diodes or the field effect transistors which are for implementing the reverse-bias preventing unit may be increased, which also increases the cost of the circuit. In addition, under the high-current working environment, the reverse-bias preventing unit with a larger volume may consume more power, thus the usage efficiency of electric power is relatively low, which also lowers the efficiency of power conversion of the motor controller. Therefore, the reverse-bias preventing mechanism of the motor controller needs to be improved.

SUMMARY

A motor controller with a reverse-bias preventing mechanism is provided according to this disclosure. The controller includes a pre-charging unit, a protection unit, a conversion unit, and a control unit. The pre-charging unit is adapted for receiving a power signal through a first electric conduction path, and for converting the power signal into a pre-charging signal according to a control signal. The protection unit is adapted for receiving the power signal through a second electric conduction path, and for determining whether to output the power signal according to the polarity of the power signal. The conversion unit is coupled to the protection unit and adapted for receiving the power signal outputted by the protection unit and adapted for converting the power signal outputted by the protection unit into a work voltage. The control unit is coupled to the conversion unit and the pre-charging unit and adapted for receiving the work voltage to generate the control signal. It's worth noting that the current of the power signal flowing through the second electric conduction path is smaller than the current of the power signal flowing through the first electric conduction path.

A motor driving device is disclosed according to this disclosure. The device includes a pre-charging unit, a protection unit, a conversion unit, a control unit, a power storing unit, a driving unit, and an inverter. The pre-charging unit is adapted for receiving a power signal through a first electric conduction path and for converting the power signal into a pre-charging signal according to a control signal. The protection unit is adapted for receiving the power signal through a second electric conduction path and for determining whether to output the power signal according to the polarity of the power signal. The conversion unit is coupled to the protection unit and adapted for receiving the power signal outputted by the protection unit as well as for converting the power signal outputted by the protection unit into a first work voltage and a second work voltage. It's worth noting that the first work voltage is different from the second work voltage. The control unit is coupled to the conversion unit and the pre-charging unit and adapted for receiving the first work voltage to generate the control signal. The power storing unit is coupled to the pre-charging unit, for receiving the pre-charging signal to generate a power storing voltage. The driving unit is coupled to the conversion unit and the control unit, and adapted for receiving the second work voltage and the control signal as well as for generating the driving signal according to the control signal. The inverter is coupled to the power storing unit and the driving unit and adapted for receiving the power storing voltage and the driving signal as well as for converting the power storing voltage into a motor driving voltage according to the driving signal. It's worth noting that the current of the power signal flowing through the second electric conduction path is smaller than the current of the power signal flowing through the first electric conduction path.

The embodiments of the features and implementations of the disclosure are described as follows along with some figures.

BRIEF DESCRIPTION OF THE DRAWINGS

This disclosure will become more fully understood from the detailed description given herein below for illustration only, thus is not limitative of the disclosure, and wherein.

DETAILED DESCRIPTION

The detailed features and advantages of the disclosure are described below in great detail through the following embodiments, the content of the detailed description is sufficient for those skilled in the art to understand the technical content of the present disclosure and to implement the disclosure there accordingly. Based upon the content of the specification, the claims, and the drawings, those skilled in the art can easily understand the relevant objectives and advantages of the disclosure.

The embodiments described below use the same symbol for representing the same or similar components.

Figure 1:
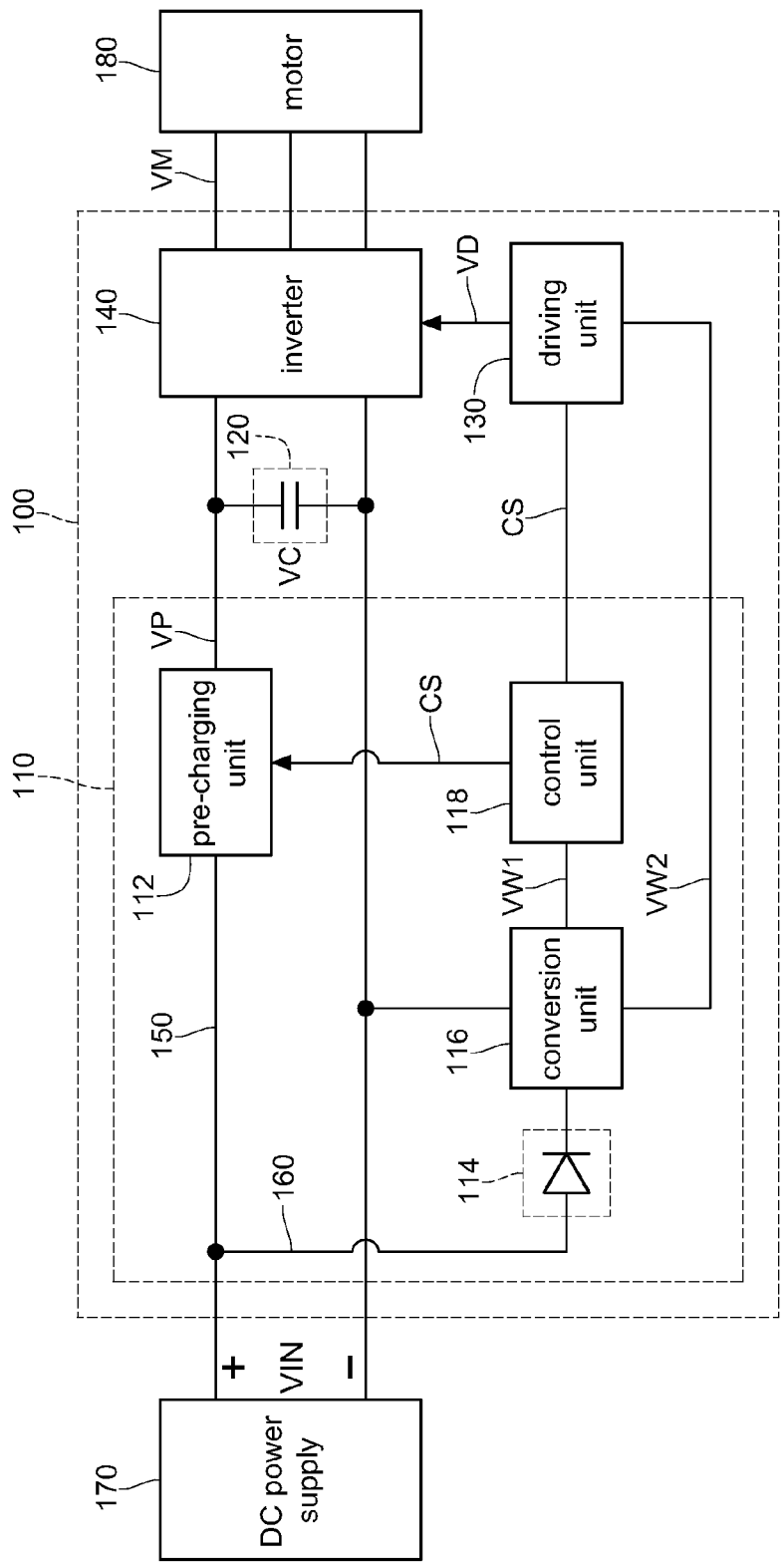
FIG. 1 is a schematic diagram of a motor driving device according to the disclosure.
Figure 2:
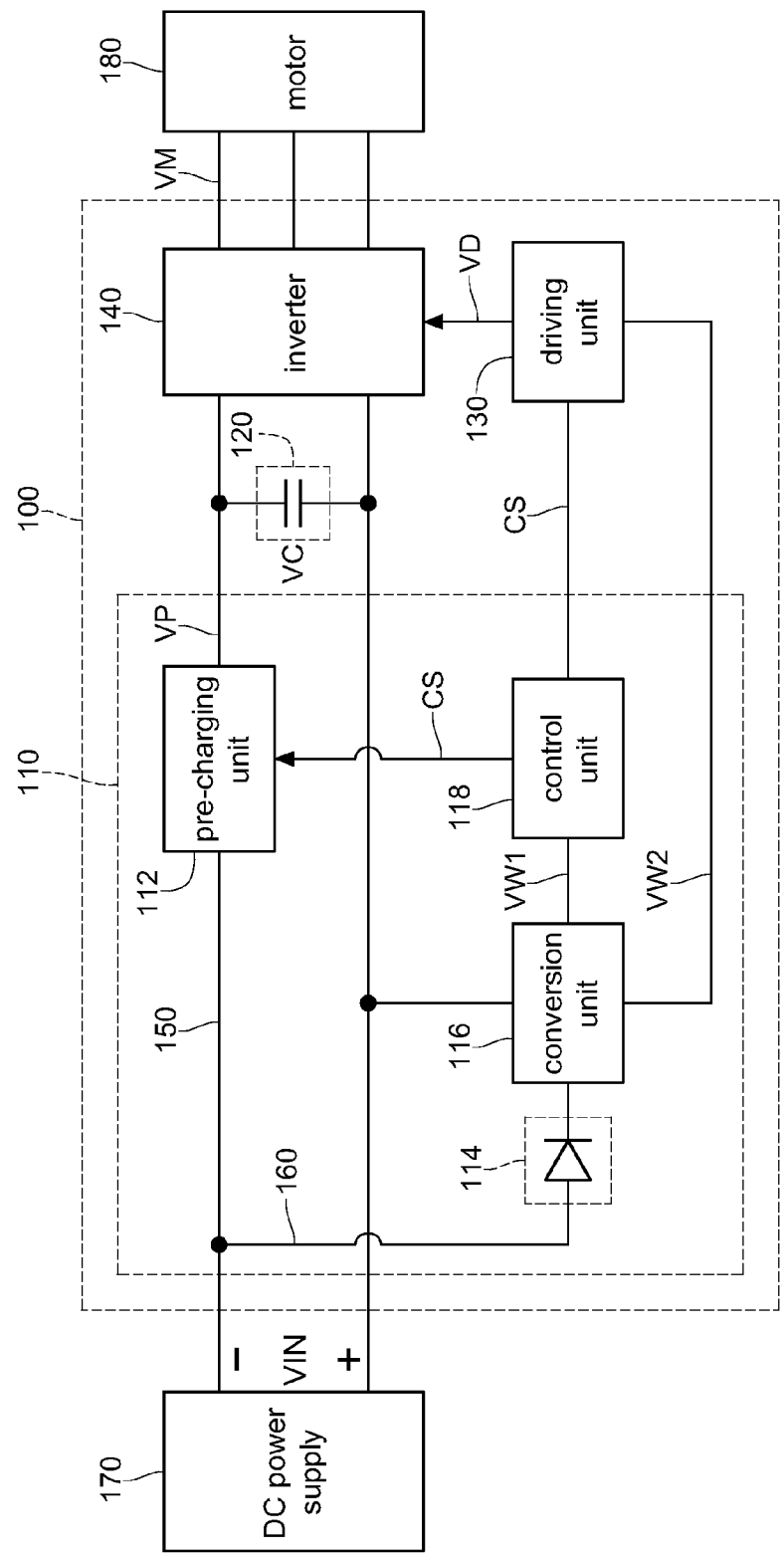
FIG. 2 is another schematic diagram of a motor driving device according to the disclosure.

Please refer to FIG. 1 and FIG. 2, which are schematic diagrams of a motor driving device and another motor driving device. In this embodiment, the motor driving device 100 is adapted for driving a motor 180. In this embodiment, the motor driving device 100, coupled to a direct-current (DC) power supply 170, is adapted for receiving a DC power signal VIN generated by the DC power supply 170, but not limited to the disclosure. The motor driving device 100 includes a motor controller 110 with a reverse-bias preventing mechanism according to the disclosure, a power storing unit 120, a driving unit 130, and an inverter 140.

The motor controller 110 with the reverse-bias preventing mechanism includes a pre-charging unit 112, a protection unit 114, a conversion unit 116, and a control unit 118. The pre-charging unit 112, coupled to the DC power supply 170 through a first electric conduction path 150, is adapted for receiving the power signal VIN. In addition, the pre-charging unit 112 is adapted for converting the power signal VIN into a pre-charging signal VP according to a control signal CS.

The protection unit 114, coupled to the DC power supply 170 through a second electrical conduction path 160, is adapted for receiving the power signal VIN. In addition, the protection unit 114 may determine whether to output the power signal VIN according to the polarity of the power signal VIN. For example, when the "positive end" of the DC power supply 170 is coupled to the protection unit 114, the protection unit 114 may determine that the polarity of the power signal VIN is "positive", which allows the power signal VIN to be outputted, as shown in FIG. 1.

When the "negative end" of the DC power supply 170 is coupled to the protection unit 114, the protection unit 114 may determine that the polarity of the power signal VIN is "negative", which forbids outputting the power signal VIN, as shown in FIG. 2. In this embodiment, the protection unit 114 is a diode, but not limited to the disclosure. That is, the protection unit 114 may also be implemented by other components having a protection mechanism.

The conversion unit 116, coupled to the protection unit 114, is adapted for receiving the power signal VIN outputted by the protection unit 114 as well as for converting the power signal VIN outputted by the protection unit 114 into a first work voltage VW1 and a second work voltage VW2. It's worth noting that the first work voltage VW1 is different from the second work voltage VW2. That is, when the protection unit 114 outputs the power signal VIN, the conversion unit 116 may convert the power signal VIN into the first work voltage VW1 and the second work voltage VW2 which are both sent to the next level circuits. When the protection unit 114 does not output the power signal VIN, the conversion unit 116 may not convert the power signal VIN into the first work voltage VW1 and the second work voltage VW2. In this embodiment, the conversion unit 116 is a DC to DC converter.

The control unit 118, coupled to the conversion unit 116 and the pre-charging unit 112, is adapted for receiving the first work voltage VW1 to generate the control signal CS. That is, when the control unit 118 receives the first work voltage VW1, the control unit 118 may start to operate and correspondingly generate the control signal CS. On the other hand, when the control unit 118 does not receive the first work voltage VW1, the control unit 118 may not work and generate the control signal CS.

The power storing unit 120, coupled to the pre-charging unit 112, is adapted for receiving the pre-charging signal VP to generate a power storing voltage VC. That is, when the pre-charging unit 112 starts to operate, it may generate the pre-charging signal VP for charging the power storing unit 120, which makes the power storing unit 120 store power and generate power storing voltage VC. When the pre-charging unit 112 does not operate, it may not generate the pre-charging signal VP, and thus the power storing unit 120 may not generate the power storing voltage VC. In this embodiment, the power storing unit 120 may be a capacitor, but not limited to the disclosure. The power storing unit 120 may be implemented by other components with power storing functionalities.

The driving unit 130, coupled to the conversion unit 116 and the control unit 118, is adapted for receiving the second work voltage VW2 and the control signal CS as well as for generating a driving signal VD according to the control signal CS. That is, when the driving unit 130 receives the second work voltage VW2 provided by the conversion unit 116, the driving unit 130 may start to operate. Then, the driving unit 130 may generate the driving signal VD according to control signal CS generated by the control unit 118.

The inverter 140, coupled to the power storing unit 120 and the driving unit 130, is adapted for receiving the power storing voltage VC and the driving signal VD as well as for converting the power storing voltage VC into a motor driving voltage VM according to the driving signal VD, to drive the motor 180. In other words, the inverter 140 is adapted for converting the DC power storing voltage VD into the three-phase AC (alternating-current) motor driving voltage VM according to the control of the driving signal VD. The motor driving voltage VM is used as the requisite working voltage for the motor 180, which makes the motor 180 execute corresponding operations.

In this embodiment, the current of the power signal VIN flowing through the second electric conduction path 160 is smaller than the current of the power signal VIN flowing through the first electric conduction path 150. That is, the current captured by the conversion unit 116 is smaller than the current captured by the pre-charging unit 112, which may effectively reduce the volume of the protection unit 114 (such as a diode), thereby reducing the cost of the circuits as well as increasing the efficiency of the motor driving device 100.

According to this disclosure, the motor controller with the reverse-bias preventing mechanism and the motor driving device, a protection unit is disposed at the second electric conduction path between the conversion unit and the power signal. In order to generate the work voltage, the protection unit may detect the polarity of the power signal for determining whether to output the power signal to the conversion unit. The outputted power signal makes the control unit to correspondingly control the operation of the pre-charging unit which receives the power signal through the first electric conduction path. Thus, the function for preventing reverse-bias may be properly implemented. In addition, the current flowing through the second electric conduction path is smaller than the current flowing through the first electric conduction path, thus the volume of the protection unit is reduced for lowering the cost of the circuits, and the efficiency of the power conversion is optimized.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to activate others skilled in the art to utilize the disclosure and various embodiments and with various modifications as are suited to the particular use contemplated. Alternative embodiments will become apparent to those skilled in the art to which the disclosure pertains without departing from its spirit and scope. Accordingly, the scope of the disclosure is defined by the appended claims rather than the foregoing description and the exemplary embodiments described therein.

What is claimed is:

1. A motor controller with a reverse-bias preventing mechanism, comprising:
   a pre-charging unit for receiving a power signal through a first electric-conduction path and for converting the power signal into a pre-charging signal according to a control signal;
   a protection unit for receiving the power signal through a second electric-conduction path and for determining whether to output the power signal according to a polarity of the power signal;
   a conversion unit coupled to the protection unit, for receiving the power signal outputted by the protection unit and for converting the power signal outputted by the protection unit into a work voltage;
   a control unit coupled to the conversion unit and the pre-charging unit, for receiving the work voltage to generate the control signal;
   wherein the current of the power signal flowing through the second electric-conduction path is smaller than the current of the power signal flowing through the first electric-conduction path.

2. The motor controller with the reverse-bias preventing mechanism according to claim 1, wherein the protection unit is a diode.

3. A motor driving device, comprising:
   a pre-charging unit for receiving a power signal through a first electric-conduction path and for converting the power signal into a pre-charging signal according to a control signal;
   a protection unit for receiving the power signal through a second electric-conduction path and for determining whether to output the power signal according to a polarity of the power signal;
   a conversion unit coupled to the protection unit, for receiving the power signal outputted by the protection unit as well as for converting the power signal outputted by the protection unit into a first work voltage and a second work voltage, wherein the first work voltage is different from the second work voltage;
   a control unit coupled to the conversion unit and the pre-charging unit, for receiving the first work voltage to generate the control signal;
   a power storing unit coupled to the pre-charging unit, for receiving the pre-charging signal to generate a power storing voltage;
   a driving unit coupled to the conversion unit and the control unit, for receiving the second work voltage and the control signal as well as for generating a driving signal according to the control signal; and
   an inverter coupled to the power storing unit and the driving unit, for receiving the power storing voltage and the driving signal as well as for converting the power storing voltage into a motor driving voltage according to the driving signal;
   wherein the current of the power signal flowing through the second electric-conduction path is smaller than the current of the power signal flowing through the first electric-conduction path.

4. The motor driving device according to claim 3, wherein the protection unit is a diode.

5. The motor driving device according to claim 3, wherein the power storing unit is a capacitor.

6. The motor driving device according to claim 3, wherein the power signal is a direct-current (DC) signal, and the motor driving voltage is an alternating-current (AC) voltage.

* * * * *